(12) United States Patent
Tenbrook et al.

(10) Patent No.: US 8,204,477 B2
(45) Date of Patent: Jun. 19, 2012

(54) SYSTEMS AND METHOD FOR TRIGGERING PROXIMITY DETECTION

(75) Inventors: Keith A Tenbrook, Crystal Lake, IL (US); Alicia S Miller, Libertyville, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 684 days.

(21) Appl. No.: 12/266,291

(22) Filed: Nov. 6, 2008

(65) Prior Publication Data

US 2010/0113001 A1    May 6, 2010

(51) Int. Cl.
*H04M 1/66* (2006.01)
(52) U.S. Cl. .................. 455/411; 455/466; 370/331
(58) Field of Classification Search ........... 455/411, 455/466, 422.1, 553.1; 370/331
See application file for complete search history.

(56) References Cited

U.S. PATENT DOCUMENTS

| | | | |
|---|---|---|---|
| 5,592,560 A | 1/1997 | Deaton et al. |
| 5,884,024 A | 3/1999 | Lim et al. |
| 6,014,090 A | 1/2000 | Rosen et al. |
| 6,115,754 A | 9/2000 | Landgren |
| 6,243,039 B1 | 6/2001 | Elliot |
| 6,353,390 B1 | 3/2002 | Beri et al. |
| 6,507,279 B2 | 1/2003 | Loof |
| 6,618,593 B1 | 9/2003 | Drutman et al. |
| 6,823,188 B1 | 11/2004 | Stern |
| 6,915,135 B1 | 7/2005 | McKee et al. |
| 7,082,365 B2 | 7/2006 | Sheha et al. |
| 7,099,921 B1 | 8/2006 | Engstrom et al. |
| 7,155,405 B2 | 12/2006 | Petrovich |
| 7,233,792 B2 | 6/2007 | Chang |
| 7,263,086 B2 | 8/2007 | Viikari et al. |
| 2006/0149844 A1 | 7/2006 | Droz et al. |
| 2010/0087164 A1* | 4/2010 | Ritzau et al. .................. 455/411 |

* cited by examiner

*Primary Examiner* — Phuoc Doan

(57) ABSTRACT

Disclosed are methods and devices including a mobile communication device, a proximity application server and a receiving device. The methods of the mobile communication device include receiving an enterprise identification signal that may be an SSID transmitted by an enterprise access point. The user of the mobile communication device may have opted into receiving the services of the enterprise in accordance with the disclosed methods and devices. Therefore, the mobile communication device may generate a proximity data signal including an indication of receipt of the enterprise identification signal and an identifier of the mobile communication device. The identifier may be the telephone number of the mobile communication device. The mobile communication device can then transmit the proximity data signal to a proximity application server. The proximity application server can correlate the proximity data signal. Correlated data in turn may be sent back to a receiving device of the enterprise.

16 Claims, 3 Drawing Sheets

SYSTEMS AND METHOD FOR TRIGGERING PROXIMITY DETECTION

FIELD

Disclosed are systems, methods and devices including a mobile communication device, a proximity application server and a receiving device.

BACKGROUND

Many mobile communication devices come equipped with multiple transceivers for communication over different types of networks such as wireless fidelity (WIFI) or wireless local area network (WLAN) in addition to Global System for Mobile Communications (GSM) and Code Division Multiple Access (CDMA) networks, depending upon preferences and efficiencies. Dual-mode mobile communication devices leverage the ubiquity of wide-area networks (GSM and CDMA) with the high performance and low operational costs of local-area WIFI networks. WIFI is the trade name for the popular wireless technology used in home networks, mobile phones, video games and more. WIFI "hot spots" are installed in offices or homes, hotels, restaurants, airports and neighborhood area networks. It is expected that the hotspots will expand their reach as more systems are installed. Particularly in areas with clusters of retail enterprises such as hotels and restaurants, a user of a mobile communication device may be in range of a plurality of wide-area networks and WIFI networks simultaneously.

Users of mobile communication devices often maintain their devices in the "on" mode or state. In this way, they are able to receive calls and other types of communication. For example, a dual-mode device including a cellular transceiver and a WIFI transceiver, in the on mode, the device may be in "active scanning mode" for a WIFI signal. WIFI systems to connect to the Internet are often provided by enterprises free-of-charge to customers. Alternatively, a WIFI system may be used internally by the enterprise.

DETAILED DESCRIPTION

Figure 1:
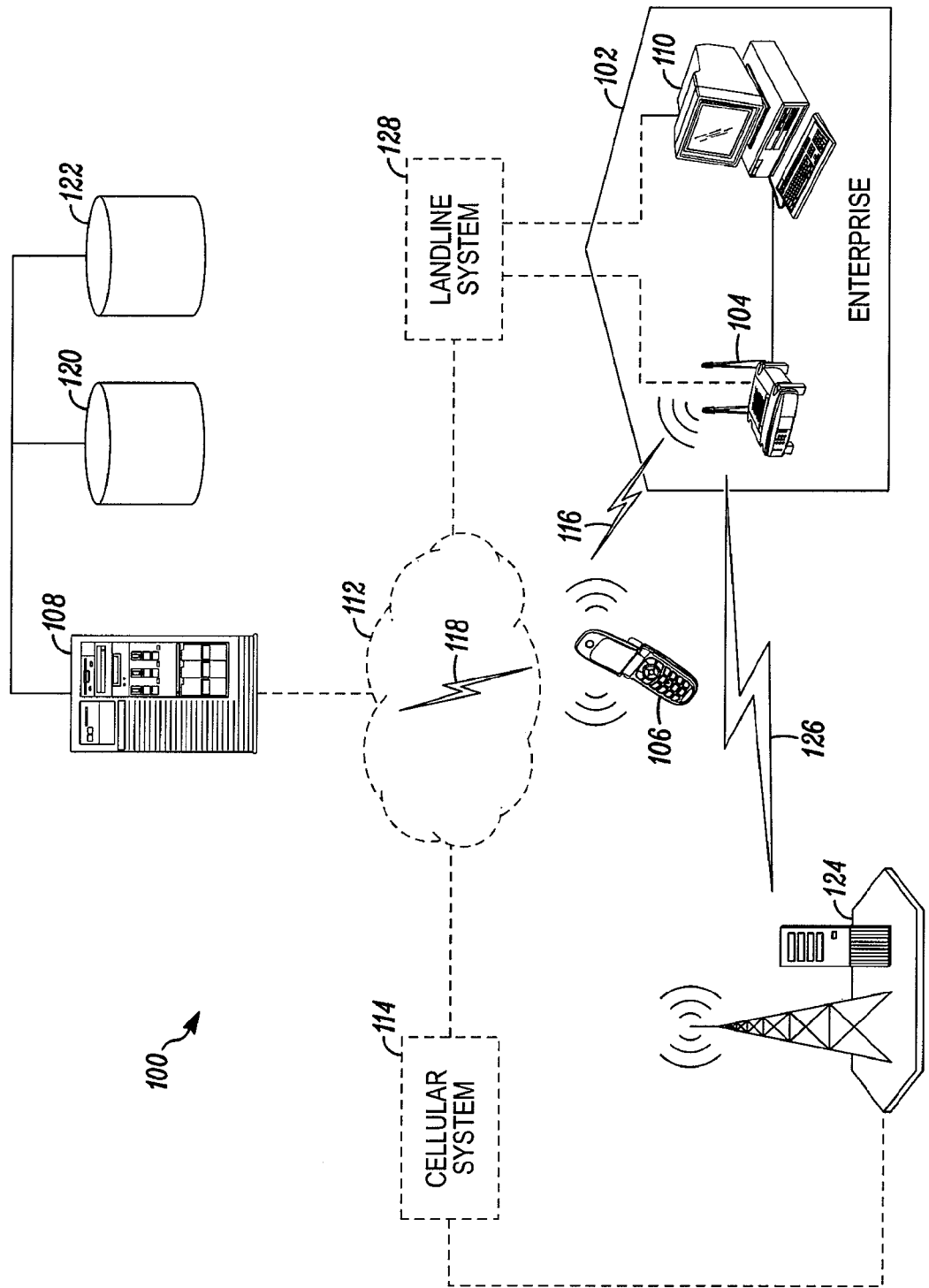
FIG. 1 illustrates an embodiment of a system including an enterprise including an AP, a dual-mode mobile communication device, a proximity application server and a receiving device of the enterprise.

It may be beneficial if an enterprise, such as a retail enterprise could leverage its WIFI infrastructure to benefit its customers by improving customer service. Disclosed are methods of dual-mode mobile communication devices configured to receive an enterprise identification signal that may be a WIFI beacon frame including a Service Set Identifier (SSID) and configured to transmit and receive via a transmission channel of a cellular network. In a WLAN, an access point (AP) is a station that transmits and receives data (sometimes referred to as a transceiver). An access point can serve as the point of interconnection between the WLAN and a fixed wire network such as the Internet. Beacon Frames, transmitted by an access point, are frames that have control information and are transmitted to help a wireless station, such a mobile communication device to identify nearby APs in passive scanning mode. APs indicate to the wireless stations about the existence of the network. The Beacon Frame sent by the AP contains control information and can be used by a mobile station to locate an AP if the mobile station is on active scanning mode. A Beacon Frame can contain a SSID, a 32-character unique identifier attached to the header of packets sent over a WLAN that acts as a password when a mobile device tries to communicate with the AP. An SSID is also referred to as a network name because essentially it is a name that identifies a wireless network.

Disclosed are methods and devices including a mobile communication device, a proximity application server and a receiving device. The methods of the mobile communication device include receiving an enterprise identification signal that may be an SSID transmitted by an enterprise access point. The user of the mobile communication device may have opted into receiving the services of the enterprise in accordance with the disclosed methods and devices. Therefore, the mobile communication device may generate a proximity data signal including an indication of receipt of the enterprise identification signal and an identifier of the mobile communication device. The identifier may be the telephone number of the mobile communication device. The mobile communication device can then transmit the proximity data signal to a proximity application server. The proximity application server can correlate the proximity data signal. Correlated data in turn may be sent back to a receiving device of the enterprise.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 illustrates an embodiment of a system 100 including an enterprise 102 including an AP 104, a dual-mode mobile communication device 106, a proximity application server 108 and a receiving device 110 of the enterprise. The mobile communication device 106 is configured to receive communication from the AP 104 of the enterprise 102 as well as provide communication with the proximity application server 108. The proximity application server 108 in turn is configured to provide communication to the receiving device 110 of the enterprise 102.

The mobile communication device 106 may be implemented as a cellular telephone (also called a mobile phone). The mobile communication device 106 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, WIFI, Bluetooth, the capability of transferring digital data, SMS messaging, Internet access, multi-media content access and/or voice over internet protocol (VoIP).

The proximity application server 108 is depicted as a remote server within a wireless communication network, either or both the Internet 112 and/or a cellular system 114. The networks 112 and/or 114 of course may be any type of wireless network including an ad hoc or wireless personal area network, a WIFI wireless local area network, and a cellular or wireless wide area network. Both the Internet 112 and the cellular system 114 are indicated by dashed lines because any and all modes of transmitting data are within the scope of this discussion.

The server 108 may be of any suitable configuration. The server 108 may be implemented as a single server or as a plurality of servers in communication in any arrangement. The operations of the server 108 may be distributed among different servers or devices that may communicate in any manner. It is understood that the depiction in FIG. 1 is for illustrative purposes.

The mobile communication device 106 that is configured to receive a WIFI beacon frame may become within range of the AP 104 so that the mobile communication device 106 can receive an enterprise identification signal 116. The WIFI beacon from AP 104 can include an enterprise local ID (WLAN SSID), that is the enterprise identification signal. It is understood that the enterprise identification signal can be transmitted via WIFI as discussed, but may be in any suitable format and may be transmitted in any appropriate manner, such as via Bluetooth. Also, such an enterprise identification signal may be sent redundantly, over more than one transmission channel. In this way, a mobile communication device equipped with one or the other type of transmitter may receive the enterprise identification signal.

An opt-in application, that allows use of the disclosed proximity detection, can be stored on the mobile communication device 106 that can determine receipt of the enterprise identification signal 116 and then can transmit a proximity data signal 118 containing a unique user ID, such as an identifier of the mobile communication device, for example, the telephone number of the mobile communication device and the enterprise local ID (WLAN SSID) to the proximity application server 108. The proximity application server 108 can be in communication with one or more data bases, for example, an enterprise data base 120 for storing enterprise IDs and a mobile communication device identifier data base 122 for storing, for example, telephone numbers of mobile communication devices. Additional and/or alternative data may be stored by the databases of the proximity application server 108 or any other database device.

As discussed above, a method of a proximity application server 108 can include receiving the proximity data signal 118 from the mobile communication device 106, correlating the proximity data signal 118 with particular data of a database, such as data bases 120 and 122 to generate correlated data, generating a correlated data signal including the correlated data and transmitting the correlated data signal to a receiving device 110. For example via a transceiver 124 of a cellular system 114, the proximity application server 108 may transmit a correlated data signal 126 to a receiving device 110. In the alternative or for redundancy, the proximity application server 108 may transmit the correlated data signal 124 to a receiving device 110 via the Internet 112, wirelessly and/or via a landline system 126. The receiving device 110, of course can be in any location. The receiving device 110 may be any type of computing device, such as a server.

The type of data relating to users of particular mobile communication devices can be obtained, utilized and stored in any number of manners. In one embodiment, particular data is stored by the mobile communication device identification database 122. In another embodiment, particular data is stored by the receiving device 110. In another embodiment, particular data is stored on both the mobile communication device identification database 122 and the receiving device 110 and/or in some other location. For example, a user's purchasing habits may be a type of data that is stored. For a particular enterprise, a user of mobile communication device 106 may be a particularly good customer, one making ample purchases from that enterprise 102. Other types of data stored in the mobile communication device identifier data base 122 and/or the receiving device 110 may include any type of ratings, product or service preferences, previous purchase history, and/or consumer specific data (such as clothes size) that can be used by an enterprise to target the particular user of an identified mobile communication device 106.

Figure 2:
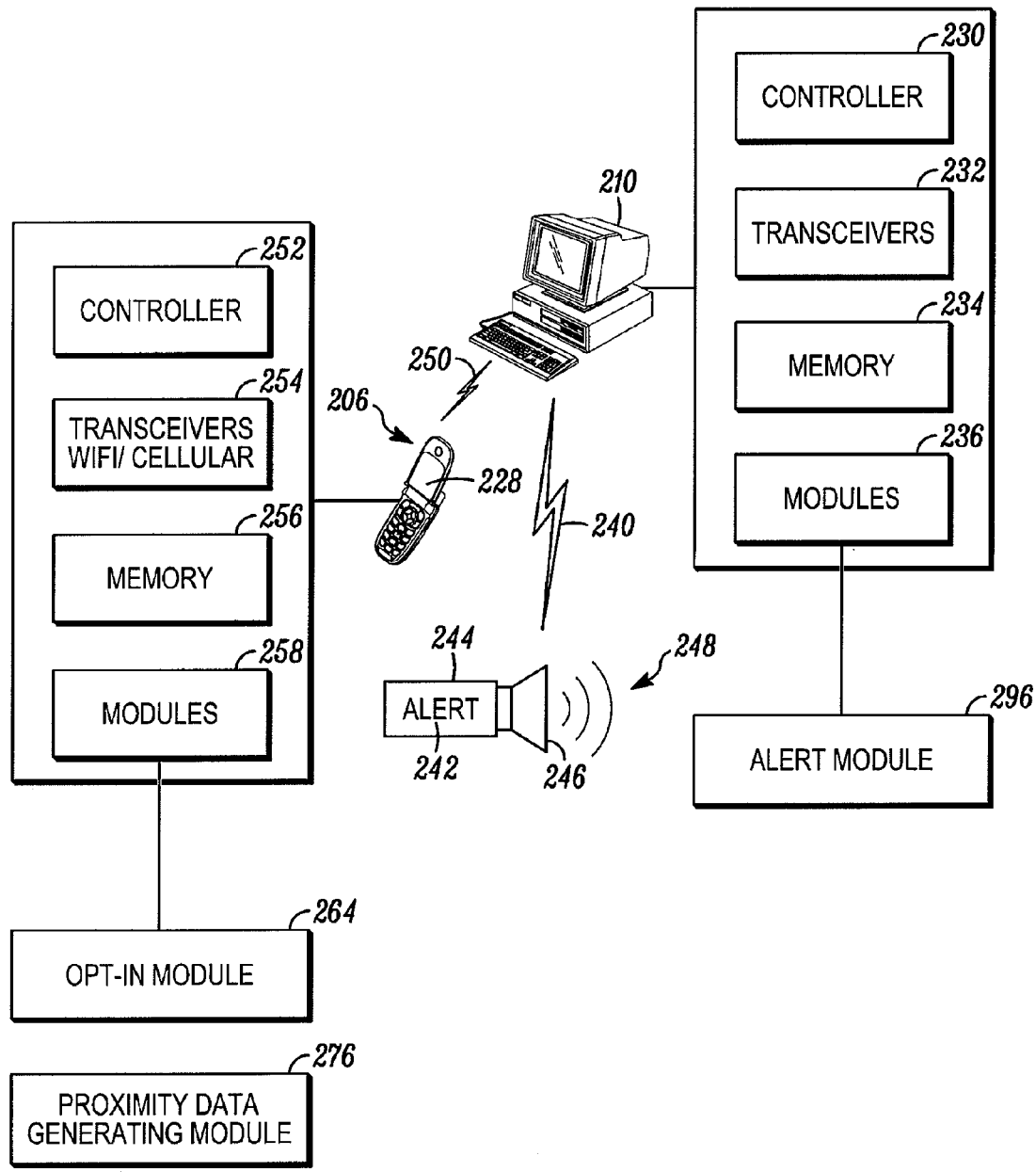
FIG. 2 illustrates an embodiment of the receiving device as it is in communication with the same or a different mobile communication device of FIG. 1, and other devices.

FIG. 2 illustrates an embodiment of the receiving device 210 as it is in communication with the same or a different mobile communication device 206 of FIG. 1, and other devices. The data of the correlated data signal 124 (see FIG. 1) received by the receiving device 210 may be used by the enterprise 102 or another entity to provide information to the enterprise and the public.

As discussed above, it may be beneficial if an enterprise, such as a retail enterprise could leverage its WIFI infrastructure to provide the public with more services and better service. A user of the mobile communication device 206 may have opted into receiving the services of the enterprise 102 (see FIG. 1) as described herein. The opt-in option may be provided by an application of the mobile communication device 206 in accordance with an opt-in module 264. When the mobile communication device 206 first receives a WIFI beacon frame from an enterprise, the user may receive a prompt exhibited on the display screen 228 to opt-in to the service described. Other methods for opting in are within the scope of this discussion. Accordingly, when the mobile communication devices 206 receives an enterprise identification signal 116 that may be a WIFI beacon frame including an SSID, and in response generates a proximity data signal in accordance with a proximity data generating module 276, the mobile communication device 206 can transmit the proximity data signal 118 to a proximity application server. The proximity data signal 118 sent to the proximity application server 108 can be used by the proximity application server 108 to correlate data in a database such as 120 and 122 which in turn may be sent back to a receiving device 210 of the enterprise 102. The data of the correlated data signal 124 sent to the receiving device 210 may be used by the enterprise 120 or another entity to generate an alert in accordance with an alert module 296 to provide information to the enterprise and the public with services.

The modules can carry out certain processes of the methods as described herein. Steps of methods may involve modules and modules may be inferred by the methods discussed herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

The receiving device may include a controller 230, transceiver 232, memory 236 and modules 238 so that it may receive signals, process signals and the data they contain, generate signals and transmit the signals. As mentioned above, a correlated data signal 124 (see FIG. 1) may be transmitted to the receiving device 210, for example, via a cellular system 114. The receiving device 210 can receive the correlated data signal 124 process the correlated data signal 124 and generate an alert signal 240 based on, at least in part, the correlated data signal 124. The alert 242 may be displayed on a display 244 and/or may be announced in any suitable manner. Staff of the enterprise may carry, for example, a mobile communication device including the display 244, and/or a speaker 246 to provide an audible alert 248. The alert may be a vibration of the mobile communication device, indicating that the staff access another information imparting device. It is understood that the alert may be formed in any manner and may be utilized by the enterprise 102 to inform staff and/or another entity and/or device such as a computer-based program that the user of the mobile communication device 206 is within a particular proximity to the enterprise 102.

The information imparted to the enterprise 102 about the proximity of the user of the mobile communication device 206 can be used in any number of manners. For example, upon receiving the correlated data signal 124 (see FIG. 1), the receiving device 210 can generate information data signal 250 including information at least in part based on the correlated data of the correlated data signal 124 and transmit the same to the mobile communication device 206. The information data signal 250 may carry with it information that could be useful to the user of the mobile communication device 206. The mobile communication device 206, including a controller 252, dual transceivers 254, memory 256 and modules 258 may receive any of communication from the receiving device 210. For example, the enterprise 102, having knowledge about the user of the mobile communication device 206, may push to the mobile communication device 206 certain offers that may be displayed on the display of the mobile communication device. The push may be via a cellular network or any other type of transmission channel.

Figure 3:
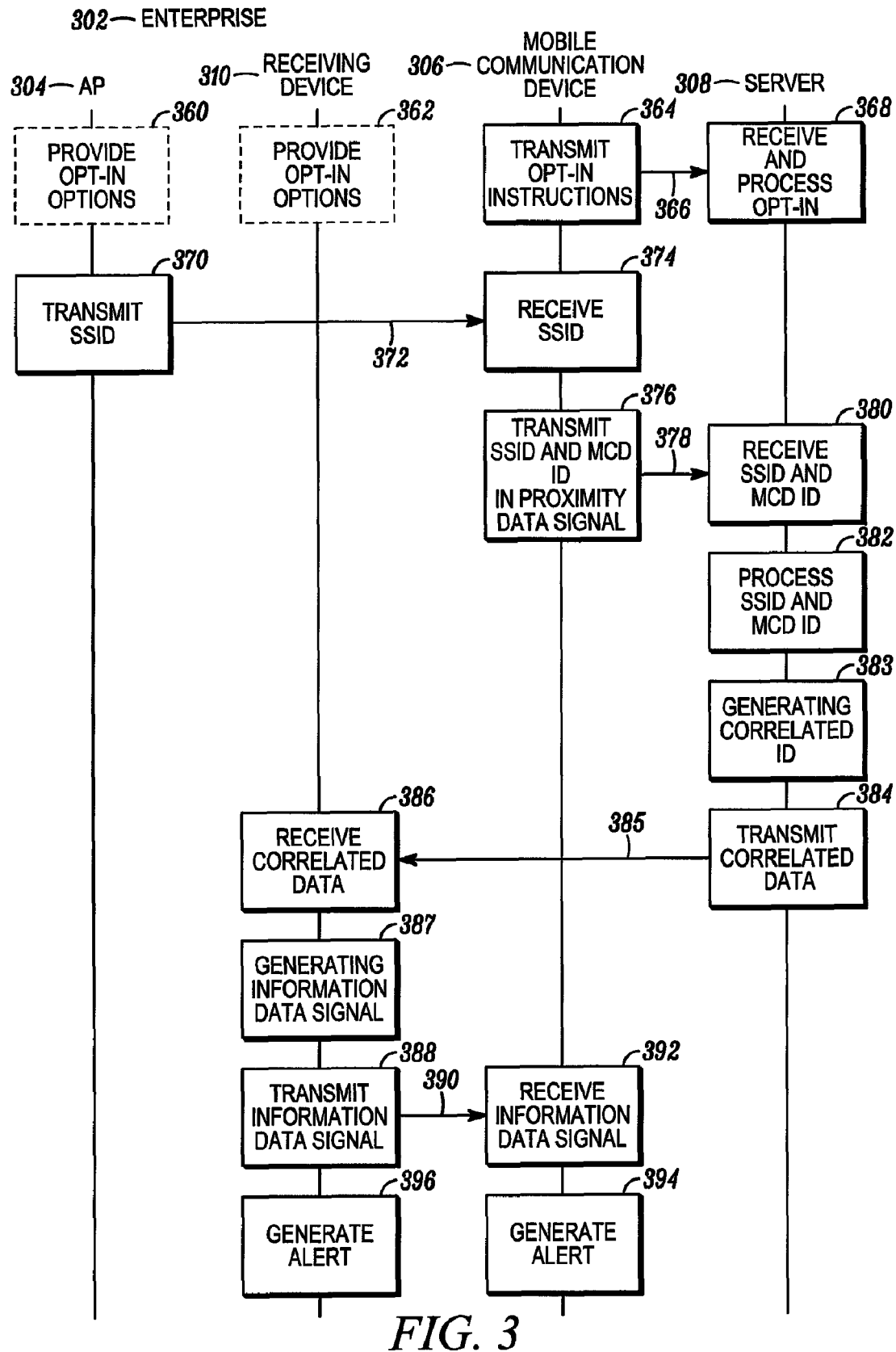
FIG. 3 is a signal flow diagram of an embodiment of the method of a proximity application server, a mobile communication device, an AP and a receiving device of an enterprise.

FIG. 3 is a signal flow diagram of an embodiment of the method of a proximity application server 308, a mobile communication device 306, an AP 304 and a receiving device 310 of an enterprise 302. As discussed above, opt-in options for the mobile communication device 306 may be provided in any number of manners. The AP 304 can provide 360 an opt-in option for the mobile communication device 306. Additionally, or alternatively the receiving device 310 can provide 362 an opt-in option for the mobile communication device 306. The mobile communication device 306 can transmit 364 opt-instructions in accordance with the opt-in module 264 (see FIG. 2) by any suitable transmission channel 366, including a cellular network, to the proximity application server 308 which can receive 368 the instructions and process them.

As discussed above, a user of the mobile communication device 306 can come into range of the AP 304 as it transmits 370 its beacon frames, including its SSID according to a WIFI transmission channel 372. The mobile communication device 306 can receive 374 the SSID. The mobile communication device 306 can then transmit 376 the SSID and its own ID in accordance with any suitable transmission channel 378, for example that of a cellular network in accordance with the proximity data generating module 276 (see FIG. 2). The proximity application server 308 can therefore receive 380 the SSID and the mobile communication device 306 ID. The proximity application server 308 can process 382 the SSID and the mobile communication device 306 ID to generate 383 correlated data. The proximity application server 308 can transmit 384 the correlated data according to any suitable transmission channel, such as that of a cellular network 385.

The receiving device 310 can receive 386 the correlated data and process it in any suitable manner, as described above. For example, the receiving device 310 can generate an information data signal 387 and transmit 388 the information data signal by any suitable transmission channel, such as that of a cellular network 390 to the mobile communication device 306. The mobile communication device 306 can generate 394 an alert as mentioned above. Also, or alternatively, the receiving device 310 can generate an alert 396 as described above in accordance with the alert module 296 (see FIG. 2).

It may be beneficial if an enterprise, such as a retail enterprise could leverage its WIFI infrastructure to benefit its customers by improving customer service. A user of the mobile communication device may have opted into receiving the services of the enterprise. By the user opting-in, the mobile communication device of the user can receive the enterprise ID and transmit the same and its own ID to the proximity server, which in turn can correlate data which can then be used by the enterprise to provide service to the user.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:
1. A mobile communication device, comprising:
a first transceiver configured to receive an enterprise identification signal;
a controller configured to detect receipt of an enterprise identification signal and configured to generate a proximity data signal including an indication of receipt of the enterprise identification signal and an identifier of the mobile communication device; and
a second transceiver configured to transmit the proximity data signal to a proximity application server in order to cause transmission of a correlated data signal based on a correlation of the proximity data signal with particular data of a database.

2. The device of claim 1, wherein the enterprise identification signal is a Service Set Identifier signal.

3. The device of claim 1, wherein the first transceiver is a WIFI transceiver.

4. The device of claim 1, wherein the second transceiver is a cellular transceiver.

5. The device of claim 1, wherein the first transceiver and the second transceiver are the same transceiver.

6. The device of claim 1, further comprising:
   an opt-in module configured to generate an option message when the controller detects receipt of an enterprise identification signal.

7. The device of claim 6, wherein the mobile communication device includes a display screen and wherein the option message is exhibited on the display screen.

8. A method of a mobile communication device, comprising:
   receiving an enterprise identification signal at a transceiver;
   generating a proximity data signal including an indication of receipt of the enterprise identification signal and an identifier of the mobile communication device; and
   transmitting the proximity data signal to a proximity application server in order to cause transmission of a correlated data signal based on a correlation of the proximity data signal with particular data of a database.

9. The method of claim 8, wherein receiving an enterprise identification signal comprises receiving a WIFI Service Set Identifier signal.

10. The method of claim 8 wherein transmitting the proximity data signal to a proximity application server comprises transmitting the proximity data signal via a cellular network.

11. The method of claim 8 further comprising a method of the receiving device, comprising:
   receiving the correlated data signal;
   processing the correlated data;
   generating an alert based on the correlated data; and
   announcing the alert.

12. The method of claim 11 wherein announcing the alert comprises:
   at least one of exhibiting indicia on a display of the receiving device and
   generating an audio alert by audio output of the receiving device.

13. The method of claim 8 further comprising a method of the receiving device, comprising:
   receiving the correlated data signal;
   processing the correlated data;
   generating information data signal including information at least in part based on the correlated data; and
   transmitting to the mobile communication device the information data signal.

14. A method of a proximity application server, comprising:
   receiving a proximity data signal indicating receipt of an enterprise identification signal and an identifier of a mobile communication device from a mobile communication device;
   correlating the proximity data signal with particular data of a database to form correlated data;
   generating a correlated data signal; and
   transmitting the correlated data signal to a receiving device in order to cause an announcement of an alert based on the correlated data.

15. The method of claim 14 wherein announcing the alert comprises:
   at least one of exhibiting indicia on a display of the receiving device and
   generating an audio alert by audio output of the receiving device.

16. The method of claim 14 further comprising a method of the receiving device, comprising:
   receiving the correlated data signal;
   processing the correlated data;
   generating an information data signal including information at least in part based on the correlated data; and
   transmitting to a mobile communication device the information data signal.

* * * * *